Patented Mar. 15, 1938

2,111,183

UNITED STATES PATENT OFFICE

2,111,183

DYES OF THE POLYMETHINE SERIES AND PREPARATION OF THE SAME

Isidor Morris Heilbron, Manchester, England, and Francis Irving, Grangemouth, Scotland, assignors to Imperial Chemical Industries Limited, a corporation of Great Britain No Drawing. Application September 21, 1934, Serial No. 745,004. In Great Britain January 21, 1930

3 Claims. (Cl. 260—44)

The present invention relates to the manufacture of dyes; and it comprises processes of manufacturing dyestuffs of the polymethine type from heterocyclic compounds wherein cyclic ammonium salts containing a reactive methyl group and the methylene bases of such salts are reacted with substituted alpha-halogenated acrylic compounds, advantageously in the salt form, having the following general formula

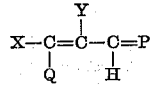

wherein X represents a replaceable monovalent substituent, such as a halogen, hydroxyl, amino, substituted amino, alkoxy or acetoxy group, P represents a replaceable divalent substituent, such as O, (OR)$_2$, or NR (the R being alkyl, aryl or aralkyl), Y represents a halogen and Q represents hydrogen or the group CO$_2$H, alpha-halogeno-beta-anilino-acroleinanil may be advantageously used as the said substituted acrylic compound, and the dyestuff thereby produced is recovered from the reaction products; and it further comprises the dyestuffs so obtained, said dyes being of the polymethine type and having the probable general formula

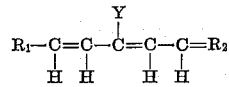

wherein Y represents a halogen and R$_1$ represents a heterocyclic nucleus in the form of a halide salt and R$_2$ represents a heterocyclic nucleus, many of said dyes being useful as photosensitizers; all as more fully hereinafter set forth and as claimed.

The present application is a continuation in part of our prior and copending application Serial No. 509,533. That application is directed to the manufacture of sensitized photographic emulsions, wherein certain dyestuffs of the polymethine series are used as photographic sensitizers. The present application is directed to the manufacture of dyes of the polymethine series, these dyes including the dyestuffs recited as photographic sensitizers in said copending application.

We have found that valuable dyestuffs of the polymethine series may be produced by reacting two mols of certain heterocyclic compounds containing a reactive methyl group or a methylene group, with one mol. of substituted alpha-halogenated acrylic compounds. The reaction may be effected in the presence of a solvent or diluent. For instance, acetic anhydrid, alcohols such as ethyl alcohol and propyl alcohol, pyridine, piperidine and the like may be used as solvents. Acetic anhydrid and alcohol are advantageous. In practicing the invention, mixtures of the heterocyclic compound, the acrylic compound and a solvent or diluent may be heated until reaction is effected, an alkali acetate being added before or after heating if desired. The dyestuff is then separated from the solvent and other reaction products, usually by crystallization. Crystallization is facilitated by cooling. Ordinarily a satisfactory yield of the dye is obtained by simply cooling the hot reaction mixture and filtering off the resulting crop of crystallized dyestuff. The collected crystals may be washed and recrystallized if additioned purification is wanted or necessary.

The stated generic invention is susceptible of many advantageous embodiments. In one embodiment an acrylic compound is condensed with one mol. of a cyclic ammonium salt containing a reactive methyl group and with one mol. of a methylene base of such cyclic ammonium salt. The methylene base may be generated, in situ, by means of an alkali salt of a weak acid. In another, one mol. of the acrylic compound in a salt form, such as the hydrochloride or hydrobromide is condensed with two mols of the methylene base of the cyclic ammonium salt.

The substituted alpha-halogenated acrylic compounds which are used in the present invention are characterized by having attached to one terminal carbon atom a replaceable divalent substituent and having attached to the other terminal carbon a replaceable monovalent substituent. With such acrylic compounds the condensation is satisfactorily accomplished and the dyestuffs obtained by the condensation have a connecting polymethine chain or bridge in which the double bonds are properly distributed. We have found certain species within this generic class of acrylic compounds which are particularly advantageous for use in the present invention. For instance, "mucochloric acid" and "mucobromic acid" having respectively the following formulae

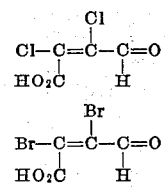

may be advantageously used. They are illustrative of the species in which Q represents CO₂H and P represents O (oxygen). Again the hydroxy compound (see Hill & Palmer, Amer. Chem. Journal No. 9 (1887) pages 147-174. Compare J. C. S. 54 (1888) page 451) having the following formula

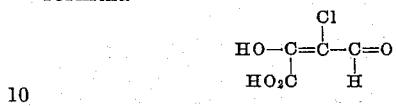

may be used as the acrylic compound. This hydroxy compound illustrates the species in which X represents OH. It also illustrates the species in which P represents oxygen.

Another advantageous sub-generic class is the group in which the replaceable divalent substituent is an anil radical (P being =NR) and the replaceable monovalent substituent is an anilino radical (X being —NHR). Representative of one species under this class is the anilino compound having the following formula

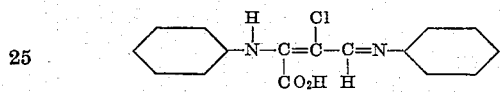

(see Simonis, Berichte deutsch chem. Gesell 34— 1901 p. 509–519). This anilino compound also illustrates the class in which Q is —CO₂H.

Another species of that sub-generic class, namely, alpha-halogeno-anilino-acroleinanil, is particularly advantageous; this species being represented by alpha-chloro-anilino-acroleinanil and alpha-brom-anilino-acroleinanil. These compounds may be used either in the form of the free base or of their salts, such as the hydrochloride or hydrobromide. When used in the salt form, they are condensed with two mols of the requisite methylene base. If used as the free base then one mol. each of the cyclic ammonium salt and its corresponding methylene base are condensed with the alpha-halogeno-anilino-acroleinanil compound.

In the present processes various heterocyclic ammonium salts containing a reactive methyl group and the methylene bases of such salts containing a reactive methylene group may be used. These heterocyclic compounds are characterized by a heterocyclic ring containing nitrogen and having either in the alpha or gamma position to said nitrogen, a reactive methyl group or methylene group. When in the form of a cyclic ammonium salt they contain a reactive methyl group and when in the form of the methylene base they contain a reactive methylene group. Within this generic class there are certain sub-generic classes and species of compounds which are especially suitable for the present purposes.

2-methyl-benzothiazole-alkyl-halides and 2-methyl-benzoxazole-alkyl-halides and their corresponding methylene bases are advantageous. The heterocyclic nucleus or ring in this class of compounds is a five-membered heterocyclic ring containing in addition to the single nitrogen and the required number of carbon atoms, a divalent atom and having a reactive methyl or methylene group attached to a carbon intermediate between said nitrogen and divalent atoms.

Other species of heterocyclic compounds which may be advantageously used in the present processes are quinolin-alkyl-halide compounds, substituted in the alpha or gamma positions with a reactive methyl or methylene group. Quinaldine alkyl halides including 4-aryl-quinaldine alkyl halides, and lepidine alkyl halides and their corresponding methylene bases, are representative of this sub-generic class and may be advantageously used.

These heterocyclic compounds are of the six-membered type and contain a reactive methyl group or methylene group in either the alpha or gamma position with respect to the single nitrogen atom. With the quinaldine compounds the said reactive group is in the alpha position whereas with the lepidine compounds the reactive group is in the gamma position.

Other species particularly advantageous, are the alpha-methyl-indoleninium-alkyl-halides and their corresponding methylene bases. 1-alkyl-2-methyl-3:3-dialkyl-indoleninium-halides are representative of this class. For instance, 2:3:3 - trimethyl - 1 - ethylindoleninium - iodide, 2:3:3-trimethyl-1-methylindoleninium iodide, or the corresponding bromides, give valuable dyes when used in the present processes. These bodies may also be used in the form of methylene bases with equally satisfactory results. This sub-generic class of heterocyclic compounds is of the five-membered type, containing in addition to the single nitrogen atom a dialkyl-substituted carbon atom and having a reactive methyl or methylene group between the nitrogen and the carbon atoms.

While we have specifically mentioned halide salts, in discussing the various sub-generic classes, it is to be understood that generally mineral acid salts may be used. In the structural formulae, given post, X generically represents a monovalent acid radical, that is, a mineral acid residue such as sulphate (1/2H₂SO₄) or other acid radical.

The new dyestuffs produced by the present processes are basic dyestuffs possessing valuable properties. They are suitable for the ordinary dyestuff purposes and when so used give advantageous results. But probably the most valuable use for these new dyestuffs results from our discovery that photographic plates of high sensitivity to red and infra-red light may be obtained by the application of some of our new dyestuffs as sensitizers; an invention disclosed and claimed in the acknowledged copending application Serial No. 509,533.

The dyestuffs produced in accordance with the present invention are of the polymethine series and may be represented generically by the following structural formula

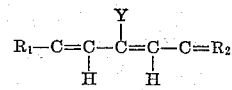

wherein Y represents a halogen, R₁ represents a heterocyclic nucleus in the form of a salt and R₂ represents a heterocyclic nucleus. This generic class of chemical compounds is characterized by having a halogen substituent in the methylene chain or bridge, that is, in the unsaturated hydrocarbon straight chain, linking or connecting together the two heterocyclic nuclei. These dyestuffs are halogenated di-carbocyanine compounds.

Within this generic class of compounds, there are many sub-generic classes and species which are particularly valuable and advantageous.

Some of these sub-generic classes and species are as follows:

I.

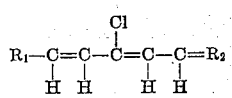

II.

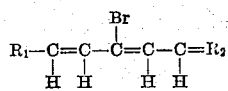

III.

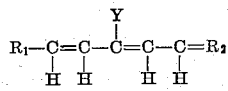

The above sub-generic classes of compounds may be obtained by selecting the acrylic compound to produce the chain linkage or bridge as indicated in these formulae. The following sub-generic classes may be produced by suitably selecting the heterocyclic nitrogen compound to give the heterocyclic nuclei as indicated below.

1. (Five-membered heterocyclic radicals as $R_1$ and $R_2$)

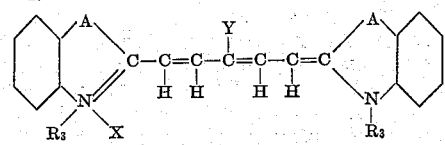

wherein $R_3$ represents an alkyl group, Y represents a halogen, X represents a mineral acid radical and A represents a structure of the class consisting of

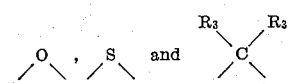

2. (Six-membered heterocyclic radicals as $R_1$ and $R_2$)

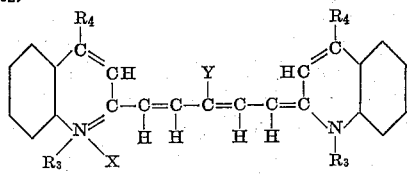

wherein $R_4$ represents hydrogen or a phenyl group.

3.

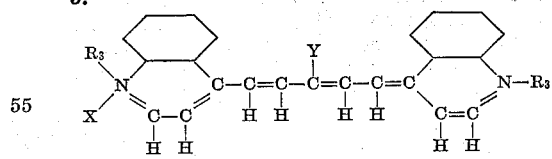

The specific examples hereinafter given, illustrate and exemplify the above sub-generic classes and species within the generic scope of the present invention. These dyes may be used in dyeing and imparting color to cotton, wool, silk and other fibers. As stated however, the greatest commercial advantage of these dyes as at present regarded, is in manufacturing sensitized photographic emulsions, these chemical compounds of the polymethine series being used as photographic sensitizers. All of the dyes specifically set forth in the illustrative examples except those of Examples 10 and 11 are photo-sensitizers. By using dyestuffs of the polymethine series under the present invention, photographic plates of high sensitivity to red and infra-red light may be obtained. For instance, in treating a photographic emulsion having a normal sensitivity to rays of wave lengths between 360 and 500 millimicrons, with the product of Example 2, there is obtained an emulsion sensitized well into the infra-red; that is, beyond 700 millimicrons wave lengths. This treatment may be effected by bathing a photographic plate with a solution of the dyestuff in aqueous alcohol and subsequently drying.

In the following examples, the parts are by weight and illustrate methods of producing dyes. The dyes produced are new and useful.

*Example 1*

10 parts of 1:2:3:3-tetramethylindoleninium iodide and 7 parts of α-bromo-β-anilinoacroleinanil hydrobromide are mixed with 80 parts of acetic anhydride and heated at 90°. To the brown colored mixture is now added 4.5 parts of crystalline sodium acetate; the color immediately becoming deep blue. Heating is continued for about half an hour at the same temperature. When the solution is cooled the dyestuff separates in greenish crystals having a metallic lustre. The product dyes tannined cotton a bright blue shade. The dyestuff obtained has the probable formula

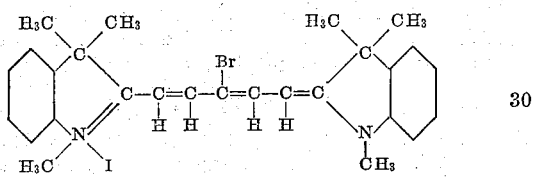

It may be regarded as 10-bromo-1:1′:3:3:3′:3′-hexamethylindodicarbocyanine iodide.

The dyestuff may be prepared as described above and also at a higher temperature, as, for example at the boiling point of the solution. Further, in place of the acetic anhydride, other solvents such as ethyl alcohol, propyl alcohol, pyridine, etc., can be used.

*Example 2*

To 7 parts of α-bromo-β-anilinoacroleinanil hydrobromide in 150 parts of alcohol is added 1.6 parts of anhydrous potassium acetate and, after raising to the boiling point, the mixture is filtered. To the filtrate 10 parts of 1:2:3:3-tetramethylindoleninium iodide in 100 parts of alcohol are added together with a further quantity (1.6 parts) of potassium acetate and the solution is gently boiled under reflux for half an hour. On cooling the dyestuff separates as described above.

*Example 3*

10 parts of 1:2:3:3-tetramethylindoleninium iodide, 6 parts of α-chloro-β-anilinoacroleinanil hydrochloride and 3 parts of anhydrous potassium acetate are mixed with 180 parts of absolute alcohol and the whole heated under reflux for 1 hour. On cooling the dye separates as a mass of green crystals. This dyestuff has the probable formula

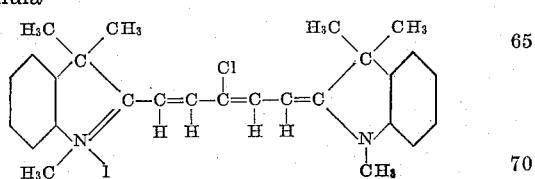

It may be regarded as 10-chloro-1:1′:3:3:3′:3′-hexamethylindodicarbocyanine iodide.

In the above examples the β-anilino-α-halogenoacroleinanils are used in the form of their salts. These, on treatment with alkali give the free compound. The free compound can be used in combination with 1 molecular proportion of 1:2:3:3-tetramethylindoleninium iodide and 1 molecular proportion of the corresponding methylene base to form the same dyestuff as is obtained by the methods described above.

Example 4

1 part of α-bromo-β-anilinoacroleinanil is dissolved in 15 parts of hot absolute alcohol and the solution is treated with 1 part of 1:2:3:3-tetramethylindoleninium iodide. When all has dissolved, the methylene base prepared from an equal amount of the indoleninium salt and dissolved in 10 parts of absolute alcohol, is added. The solution is heated at 80° for 1 hour during which the color changes from brown through green to blue. The dyestuff separates on cooling, and is purified if desired by extraction with acetone.

Example 5

3 parts of 1:2:3:3-tetramethylindoleninium iodide, 1.8 parts of α-chloro-β-anilinoacrolein, and 1 part of potassium acetate are boiled with 60 parts of absolute alcohol under reflux for 40 minutes. On cooling the dye crystallizes out as described in Example 3.

Example 6

To a solution of 7 parts of β-anilino-α-bromoacroleinanil hydrobromide in 300 parts of hot alcohol are added 10 parts of 2-methylbenzthiazole ethyliodide. The reddish-brown solution is then treated with 3.2 parts of anhydrous potassium acetate. The solution, which becomes green in color, is refluxed for 30 minutes. The dyestuff separates in green crystals. It has the probable formula

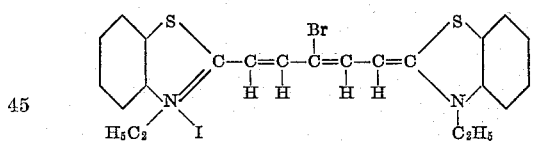

It may be regarded as 10-bromo-1:1'-diethylthiodicarbocyanine iodide. Its sensitizing maximum in use with photographic films lies at 690 millimicrons.

Example 7

To a solution of 10 parts of 1:2:3:3-tetramethylindoleninium iodide in 240 parts of hot absolute alcohol, 4.3 parts of "mucobromic" acid is added. On treating the reddish-brown solution with 3.3 parts of anhydrous potassium acetate a green color develops immediately. The solution is refluxed for 30 minutes. On cooling the dyestuff separates. This dyestuff has the probable formula

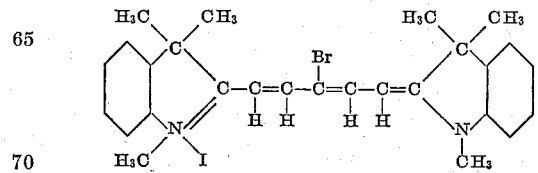

It may be regarded as 10-bromo-1:1':3:3:3':3'-hexamethylindodicarbocyanine iodide.

All the dyes produced by the processes of the foregoing examples are useful in dyeing photographic emulsions. These dyes can be represented by the general formula

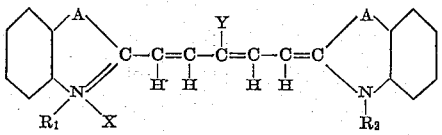

wherein $R_1$ and $R_2$ represent an alkyl group, Y represents halogen, X represents a mineral acid radical and A represents a structure of the class consisting of

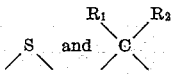

Dyeing is accomplished by bathing a photographic plate or film in a solution of the dyestuff. Various densities of coloration may be used, these being according to the effects desired. In all cases an important effect obtained is an enhanced sensitivity to red and infra-red light.

Example 8

A solution of 10 parts 2:3:3-trimethyl-1-ethylindoleninium iodide, 5.4 parts α-chloro-β-anilinoacraldehydeanil hydrochloride and 3.1 parts anhydrous potassium acetate in 150 parts by volume of acetic anhydride are heated under reflux for 1 hour. The iodide of the body obtained can be crystallized from alcohol in green needles. The corresponding chloride, obtained by heating the free trimethylindolenine base with the anil hydrochloride, is more soluble in water. The probable formula of the iodide is

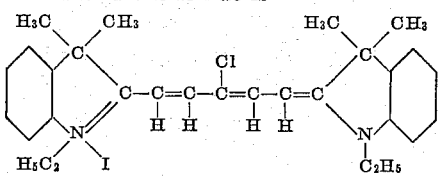

It may be regarded as 10-chloro-3:3:3':3'-tetramethyl-1:1'-diethylindodicarbocyanine iodide. It dyes tannin mordanted cotton in blue shades.

Example 9

20 parts quinaldine ethiodide and 10 parts α-bromo-β-anilinoacraldehydeanil in 70 parts (by volume) pyridine and 3 parts (by volume) piperidine are heated under reflux for 1 hour. On cooling the dye separates out. It may be recrystallized from alcohol as green crystals. It dyes wool and silk greenish blue shades. Its probable formula is

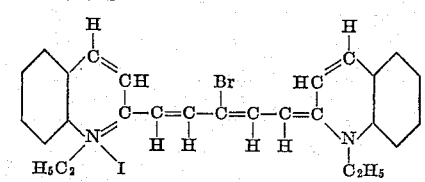

This product is a powerful photographic sensitizer with a maximum action at somewhat over 750 millimicrons.

A corresponding chloro derivative may be obtained by substituting 8.5 parts α-chloro-β-anilinoacraldehydeanil for the bromo anil. It may be regarded as 11-bromo-1:1'-diethyl-2:2'-dicarbocyanineiodide.

Example 10

10 parts 1-methylbenzoxazole ethiodide are added gradually with constant stirring to a boiling solution of 4.4 parts of α-chloro-β-anilinoacraldehydeanil and 1.7 parts anhydrous potassium acetate in 100 parts acetic anhydride contained in an open vessel. When all the materials are added heating is discontinued and the dyestuff, which separates on cooling, is filtered off. It may be purified by recrystallization from acetone. From its aqueous solution silk, wool and tannin mordanted cotton are dyed in bright reddish purple shades.

When the corresponding bromo dye is desired a larger proportion of acetic anhydride is used and the separation of the dye may be assisted by the addition of alcohol at the end of the reaction. The probable formula of this latter dye is

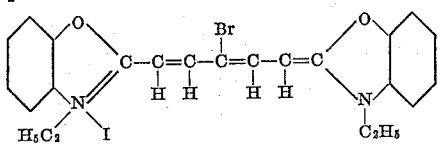

It may be regarded as 10-bromo-1:1'-diethyloxadicarbocyanine iodide. The chloro derivative is a photographic sensitizer showing its maximum sensitizing action at about 615 millimicrons with a less marked maximum at 500 millimicrons.

*Example 11*

37.5 parts 4-phenylquinaldine ethiodide is added slowly to a solution of 13 parts α-chloro-β-anilinoacraldehydeanil and 4.8 parts anhydrous potassium acetate in boiling acetic anhydride. The solution, which immediately becomes bright green, is gently refluxed for 1½ hours. The dye then usually begins to separate. Purification may be effected by repeated extraction with boiling acetone. It dyes silk from an aqueous solution in green shades. The probable formula is

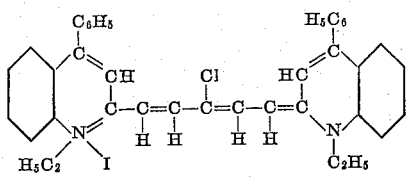

*Example 12*

30 parts 4-phenylquinaldine ethiodide and 17 parts α-bromo-β-anilinoacraldehydeanil hydrobromide in 200 parts (by volume) hot pyridine are treated with 9 parts (by volume) piperidine and heated for 3 hours on a boiling water bath. The pyridine is then removed under reduced pressure and the residue dissolved in boiling absolute alcohol from which the pure salt separates in green needles. This dye and that mentioned in Example 11 possess but little photo-sensitizing action. This is presumed to be due to the presence of a phenyl residue in the quinaldine molecule. The probable formula is

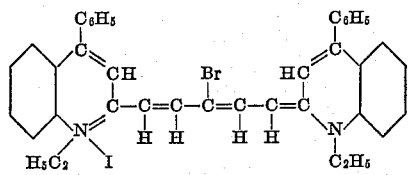

It may be regarded as 11-bromo-4:4'-diphenyl-1:1'-diethyl-2:2'-dicarbocyanine iodide.

*Example 13*

A solution of 9 parts α-chloro-β-anilinoacraldehyde and 5 parts anhydrous potassium acetate in the minimum quantity of hot acetic anhydride contained in an open vessel, is treated with 20 parts lepidine ethiodide which is gradually added within 5 to 10 minutes. The solution rapidly acquires a brownish green color and the product separates, without further heating being required. After washing with ether, the salt may be recrystallized from alcohol. The above conditions of preparation should be adhered to or brown decomposition products may result. The probable formula is

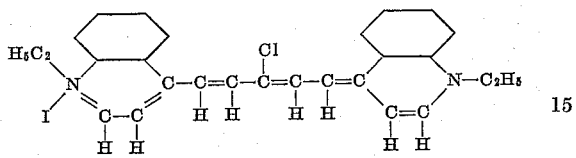

*Example 14*

A solution of 20 parts lepidine ethiodide and 14.5 parts α-bromo-β-anilinoacraldehydeanil hydrobromide in 150 parts by volume of warm dry pyridine, is treated with 13 parts by volume of piperidine. A deep bluish red color is immediately formed, changing to deep purple after two minutes boiling. The pure product, as a dye salt, separates from the solution in small green plates. The probable formula is:

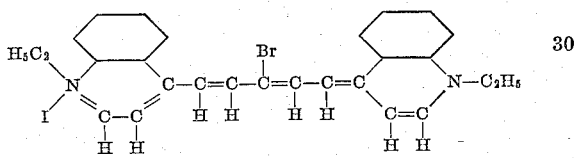

It may be regarded as 11-bromo-1:1'-diethyl-4:4'-dicarbocyanine iodide. Its photosensitizing effect appears at 840 millimicrons. By employing cyclic ammonium salts and methylene bases thereof containing different heterocyclic nuclei, unsymmetrical polymethine dyestuffs may be obtained.

As many apparently widely different embodiments of this invention may be made without departing from the spirit thereof, it is to be understood that we do not limit ourselves to the foregoing examples or descriptions except as indicated in the following claims.

What we claim is:

1. Dyes of the polymethine series designated 3:3:3':3' tetralkyl 1:1' dialkyl-indodicarbocyanine halides having the hydrogen atom in the meso position in the methenyl chain substituted by halogen.

2. Dyes of the polymethine series designated 1:1' dialkyl-thiodicarbocyanine halide having the hydrogen atom in the meso position in the methenyl chain substituted by halogen.

3. A dicarbocyanine dye selected from the group consisting of dyes of the following formula:

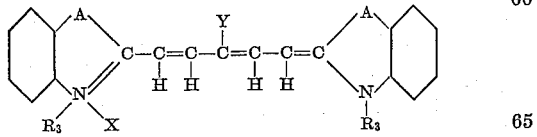

wherein Y is halogen, $R_3$ is alkyl, X is an acid radical and A is a member of the group consisting of

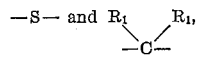

$R_1$ being alkyl.

ISIDOR MORRIS HEILBRON.
FRANCIS IRVING.

CERTIFICATE OF CORRECTION.

Patent No. 2,111,183. March 15, 1938.

ISIDOR MORRIS HEILBRON, ET AL.

It is hereby certified that error appears in the printed specification of the above numbered patent requiring correction as follows: Page 1, second column, line 17-18, for "additioned" read additional; page 3, first column, line 55, in the formula, strike out the double bond between "C" last occurrence, and "N-R$_3$" and insert instead a single bond; page 5, first column, line 25, for "500" read 560; and that the said Letters Patent should be read with these corrections therein that the same may conform to the record of the case in the Patent Office.

Signed and sealed this 10th day of May, A. D. 1938.

(Seal)

Henry Van Arsdale,
Acting Commissioner of Patents.